United States Patent [19]

Austin, Jr. et al.

[11] Patent Number: 5,203,373

[45] Date of Patent: Apr. 20, 1993

[54] FOOT-ACTUATED VALVES

[75] Inventors: George K. Austin, Jr., Newberg; Larry D. Lietz, Dundee, both of Oreg.

[73] Assignee: A-Dec, Inc., Newberg, Oreg.

[21] Appl. No.: 892,532

[22] Filed: Jun. 1, 1992

[51] Int. Cl.[5] .............................................. F16K 11/22
[52] U.S. Cl. ................................. 137/606; 137/637.1; 251/295
[58] Field of Search ............ 137/606, 607, 637, 637.1; 251/25, 295

[56] References Cited

U.S. PATENT DOCUMENTS

| Re. 30,902 | 4/1982 | Lawrence et al. |
|---|---|---|
| 641,828 | 1/1900 | Brophy ................................. 137/637 |
| 1,627,020 | 5/1927 | Dougherty ....................... 251/295 X |
| 1,856,350 | 7/1930 | Metcalf . |
| 2,775,135 | 12/1956 | Phillips ............................. 251/295 X |
| 2,929,405 | 3/1960 | Beebe ................................ 251/295 X |
| 3,151,624 | 1/1963 | Koutnik . |
| 3,480,034 | 8/1967 | Jerome . |
| 3,933,338 | 1/1976 | Herd et al. . |
| 4,116,216 | 9/1978 | Rosenberg . |
| 4,326,558 | 4/1982 | Gage . |
| 4,685,156 | 8/1987 | Brabazon ....................... 137/607 X |
| 4,901,750 | 2/1990 | Nicklas et al. .................. 137/607 X |

FOREIGN PATENT DOCUMENTS 2141712  3/1973  Fed. Rep. of Germany ...... 137/606

OTHER PUBLICATIONS

Schematic diagram of valve system installed in Assignee's facilities in 1982.

Primary Examiner—Stephen M. Hepperle
Attorney, Agent, or Firm—Klarquist, Sparkman, Campbell, Leigh & Whinston

[57] ABSTRACT

A foot-actuated valve assembly operable for delivering either a mixture of hot and cold water through a faucet, or solely cold water to the faucet. The user selectively actuates one of two sides of a kick plate. Actuation of one side of the kick plate causes a mixture of hot and cold water to flow through the faucet. Actuation of the other side of the kick plate causes only cold water to flow through the faucet.

7 Claims, 2 Drawing Sheets

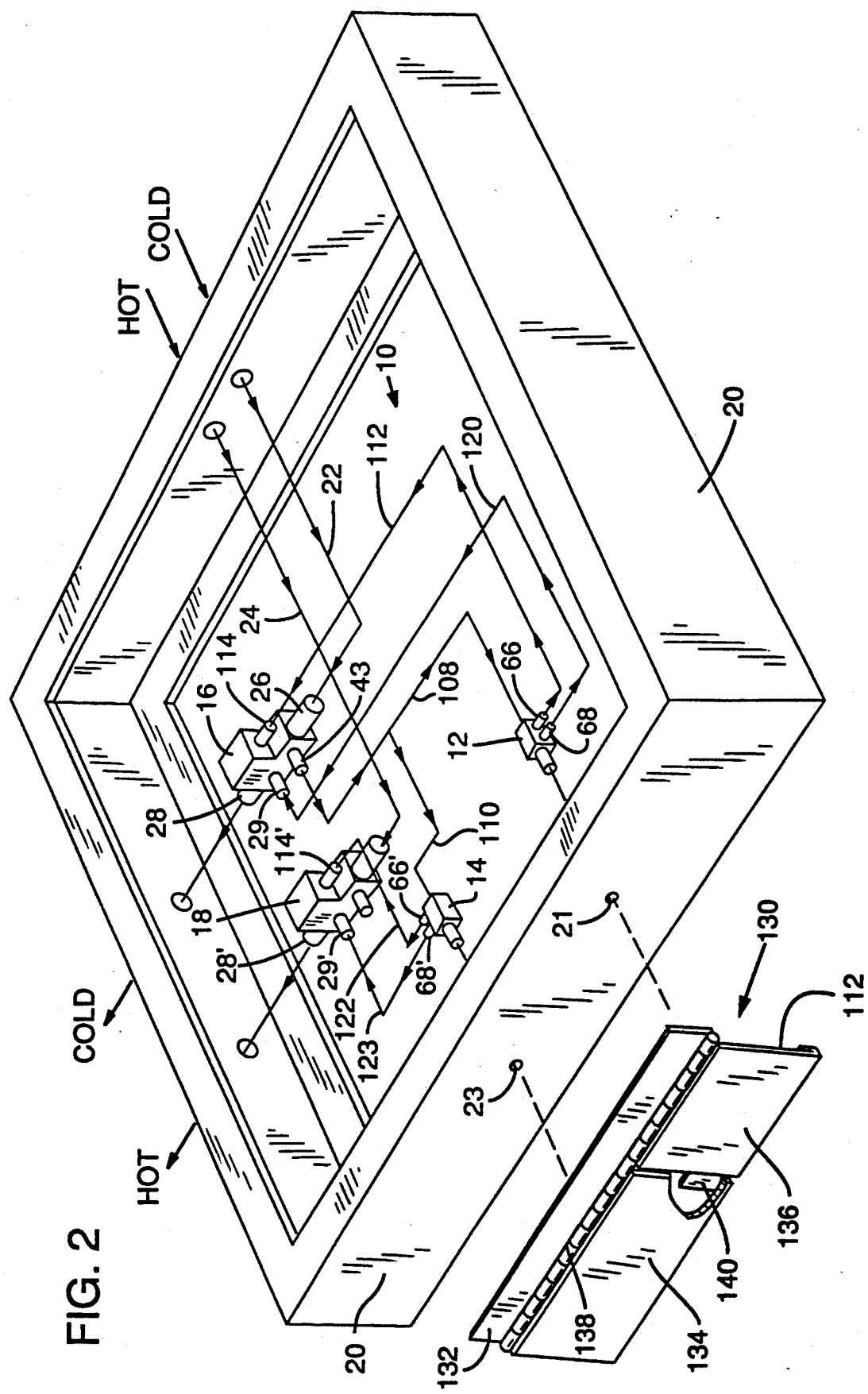

1

FOOT-ACTUATED VALVES

TECHNICAL FIELD

The present invention relates to a valve assembly that is useful in medical and dental applications, and more particularly, to a foot actuated valve assembly operable to deliver water to a wash basin or the like.

BACKGROUND INFORMATION

Foot-actuated valves for controlling the flow of fluids through a faucet are useful in a variety of settings, especially in applications related to the healthcare industries. For example, surgical suites often have scrubrooms in which the water supply to the wash basin is operated by the user depressing an actuator valve located in the floor. In this way a surgeon may scrub without handling the faucet valves. This eliminates one source of contamination. Dental offices also utilize foot controlled valves for sanitation in a similar manner.

In foot-actuated valve systems an on-off valve is plumbed into the fluid line. A faucet or some other delivery valve is located downstream from the on-off valve. The actuator valve is connected to the on-off valve. When the actuator valve is depressed it causes the on-off valve to open, allowing fluid to flow through the valve and to the faucet. Release of the actuator valve causes the on-off valve to close, stopping the fluid flow.

Where water is the fluid to be delivered, one actuator valve is usually connected to a pair of on-off valves. One of the on-off valves is plumbed into the hot water line, the other is plumbed into the cold water line. When the user depresses the actuator valve, both the hot and cold on-off valves open simultaneously to allow water to flow through the on-off valves to the faucet. The faucet is pre-set to regulate the volume of water flowing through the faucet, and the flow of hot water relative to the flow of cold water. Water at the desired temperature is delivered in this manner.

A problem with this type of a foot-actuated valve assembly is that there is only one pre-set temperature setting available at the wash basin. In other words, the mixing valve is pre-set to deliver water at a given temperature by regulating the rate of flow of hot water relative to the rate of flow of cold water. If the user wants hotter or colder water, the mixing valve must be hand adjusted to alter the relative rates of flow. This defeats the purpose of the foot-actuated valve.

SUMMARY OF THE INVENTION

This invention is directed to a foot-actuated valve assembly, and allows the user to deliver to the downstream mixing valve either a mixture of hot and cold water, or solely cold water, without changing the setting on the mixing valve.

The user may select either cold water or a mixture of hot and cold water by actuating one of two sides of a kick plate. Thus, warm water useful for washing hands may be delivered through the mixing valve by actuation of one side of the kick plate. Alternatively, cold water may be delivered to the mixing valve by actuation of the other side of the kick plate.

As another aspect of this invention, two actuator valves are utilized. One is connected to the cold on-off valve, the other is connected to the hot on-off valve. The actuator valves are also plumbed into the cold water line. When either of the actuator valves is depressed, a flow of cold water is sent through the actuator valve to the respective on-off valve. This flow of cold water functions as a signal, which causes the on-off valve to open. The use of cold water as a signal is economical.

BRIEF DESCRIPTION OF THE DRAWINGS

FIG. 2 is a perspective schematic view of the valve assembly of the present invention shown mounted in the base of a cabinet.

DETAILED DESCRIPTION OF THE PREFERRED EMBODIMENT

Figure 1:
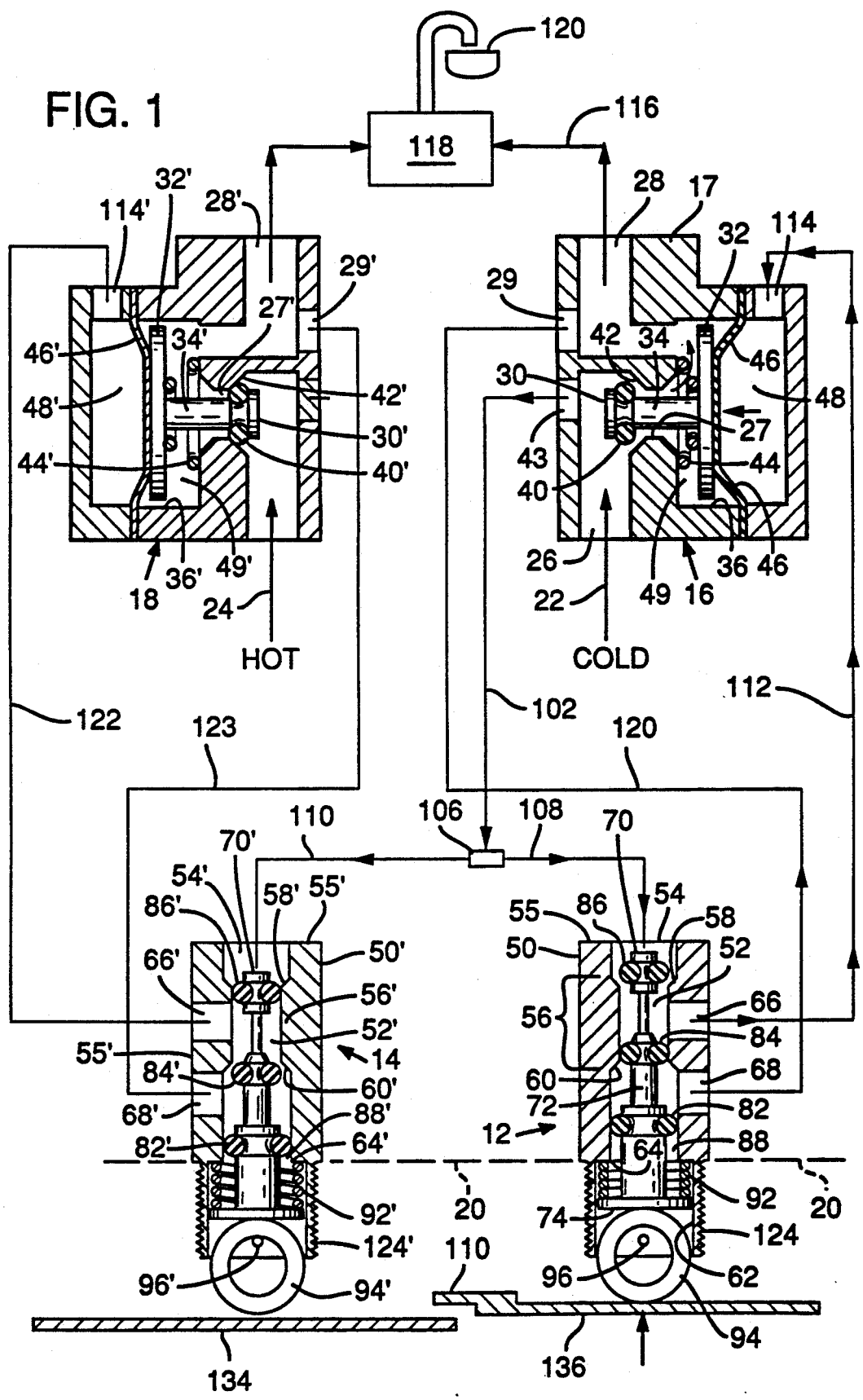
FIG. 1 is a schematic diagram of the valve assembly of the present invention, showing the valves schematically in cross-section.

The valve assembly 10 of the present invention is illustrated schematically in FIG. 1. The assembly includes a first actuator valve 12 which is operable to open a normally closed cold on-off valve 16. A second actuator valve 14 is operable to open a normally closed hot on-off valve 18. The first actuator valve 12 and the second actuator valve 14 are mounted adjacent to one another such that actuator elements thereof protrude through apertures 21 and 23 in a base 20 (FIG. 2) of a cabinet (not shown), as described more fully below. The remainder of the valve assembly is plumbed under the cabinet near the first and second actuator valves 12 and 14.

On-Off Valves

Referring to FIG. 1, the cold on-off valve 16 is connected to receive cold water from a suitable source (not shown) through an inlet line 22. The hot on-off valve 18 is connected receive hot water from a suitable source (not shown) through an inlet line 24.

The cold on-off valve 16 and the hot on-off valve 18 are substantially identical, normally closed diaphragm-type on-off valves, and are schematically illustrated in cross-section. The hot on-off valve 18 is shown in the closed, or shut-off position. The cold on-off valve 16 is shown in the open position. In this open position cold water, illustrated by the arrows, is directed into the body 17 of the valve 16 via a valve inlet chamber 26, which is connected to the cold water supply line 22 (FIG. 2). The flow of water continues through the valve 16 via a normally closed passageway 27 formed in the body 17, and out an outlet 28 adjacent to which is a port 29, the function of which will be described subsequently.

The valve 16 comprises a movable valve element 30 comprising a head 32 and a stem 34. The head 32 is positioned in a chamber 36 which is connected to the inlet 26 by the passageway 27 through which the stem 34 extends. Mounted on the stem is an O-ring 40 adapted in the closed position of the valve to engage a seat 42 formed on the valve body on the inlet side of the passageway 27. The valve element 30 is biased to closed position by a compression spring 44 positioned between the head 32 and the valve body. Extending across the chamber 36 is a flexible diaphragm 46 which engages the head 32. The diaphragm 46 divides the chamber 36 into an outer portion 48 and an inner portion 49. When the chamber outer portion 48 is subjected to pressure upon operation to be described of the central valve 12, the diaphragm 46 causes the valve element 30 to move to the open position against the bias of the spring 44, to permit water to flow through the valve 16 to the outlet 28 from which it can flow through a line 116 to a mixing valve 118 and then to a wash basin 120. When the actuator valve 12 is closed, the pressure in the chamber outer portion 48 is relieved whereupon the spring 44 can bias the valve element 30 to closed position to shut off flow of cold water through the valve 16. A port 43 is provided in the body 17 adjacent the inlet 26. Its function will be described subsequently.

The hot on-off valve 18 is shown in the shut-off position. As indicated previously, valve 18 is substantially similar in construction to valve 16 and the parts of valve 18 are identified by the same numerals with the addition of an apostrophe. Valve 18 differs from valve 16 only in not having a port comparable to port 43. In the on-off position there is no fluid flowing into the outer portion 48' of the chamber 36', which is therefore depressurized, whereby the spring 44' has biased the valve 18 to closed (off) condition.

The hot and cold on-off valves 16 and 18 are, in the illustrated embodiment, opened by fluid flowing into and pressurizing the outer portions 48 and 48' of chambers 39 and 39'. In the preferred embodiment, the fluid which causes the on-off valves to open is provided in the form of cold water, as explained below. However, the on-off valves may be opened in response to other fluids, such as hydraulic oil or air. It is also envisioned that an electromechanical valve which opens in response to an electrical signal may be utilized to open the on-off valves.

Actuator Valves

The first actuator valve 12 and the second actuator valve 14 are identical three-way ported actuator valves. These valves are schematically illustrated in cross section in FIG. 1. Since they are identical and operate identically, only the valve 12 will be described in detail. For convenience, locations of certain parts will be made to their relative vertical positioning although it will be understood the valve can operate in any orientation. The corresponding parts of valve 14 are identified by the same numeral with the addition of an apostrophe.

The actuator valve 12 includes an elongate body 50 having a longitudinal axis, and a longitudinal internal passageway 52 formed through the body 50. The internal passageway 52 defines an inlet 54 at the upper end 55 thereof. The internal passageway 52 includes a portion 56 of reduced diameter which defines a first seat 58 at its upper end nearest the inlet 54 and a second seat 60 at its opposite lower end. The lower end of the body 50 opposite the inlet 54 is counterbored at 62 to define a seat 64, the purpose of which will be explained hereinafter.

Two longitudinally spaced ports 66 and 68 extend through the wall of the body 50 and into the internal passageway 52. The port 66 extends through the wall of body 50 in the reduced diameter portion 56. The port 68 extends through the wall of body 50 beneath the reduced diameter portion 56, and adjacent to the second or lower seat 60.

A longitudinally movable plunger 70 is mounted in the internal passageway 52. The plunger 70 includes a longitudinal stem 72 having a head 74 at its lower end as the valve is illustrated. Three O-rings, including a lowermost O-ring 82, middle O-ring 84 and uppermost O-ring 86 are mounted at different positions along the length of the stem 72. The plunger 70 is longitudinally movable along the longitudinal axis within internal passageway 52 to shift the actuator valve 12 between the open and shut-off positions.

The lowermost O-ring 82 seats against the inner wall of the internal passageway 52 near the lower end 88 thereof. The function of the lowermost O-ring 82 is to prevent water from leaking out of the actuator valve 12 through the end 88. The function of the other two O-rings is to direct water through the actuator valve 12, depending upon whether the actuator valve is in the open or closed position. The middle O-ring 84 is mounted on the plunger stem 72 at a position below the second seat 60 such that when the actuator valve 12 is in its open position, as shown in FIG. 1, the middle O-ring 84 seats against the second seat 60.

The uppermost O-ring 86 is mounted on the plunger stem 72 near the upper end thereof. When the actuator valve 12 is in the open position, the uppermost O-ring 86 is positioned above the first seat 58. In the closed position of valve 12, the uppermost O-ring 86 seats upon the first seat 58.

The valve 12 is biased to closed position by a compression spring 92 mounted between the seat 64 and the plunger head 74. An actuator ball 94 is slidably mounted in the counter bore 62 and is adapted to be manually depressed to shift the valve plunger 70 from its closed to its open position. A stop 96 prevents the actuator ball 94 from being forced out of the actuator valve 12 by the force exerted thereon by the compression spring 92.

The actuator valve 14 is shown in the shut-off position in FIG. 1, in which position the uppermost O-ring 86' seats against the first seat 58'. In the shutoff position, the middle O-ring 84' is unseated from the second seat 60'.

When the force applied on the actuator ball 94' is sufficient to overcome the opposing force of the compression spring 92', the spring is compressed, and the plunger 70' is moved longitudinally in the direction toward the end 55'. This causes the middle O-ring 84' to seat against the second seat 60'. At the same time, the uppermost O-ring 86' unseats from the first seat 58'. A fluid path is thereby defined from the inlet 54', through the internal passageway 52', and through the port 66'.

When the pressure applied to the actuator ball 94' is released, the compression spring 92' moves the plunger 70' downwardly, causing the uppermost O-ring 86' to engage against the first seat 58'. At the same time, the middle O-ring 84' unseats from the second seat 60'. This is the shut off position. In this position of the valve 14, a fluid path is defined from the port 66' through the internal passageway 52', and through the port 68'.

Cold water is supplied to the first actuator valve 12 and the second actuator valve 14 from the inlet line 22 via a fluid supply line 102 connected to the port 43 in the inlet chamber 26 of the valve 16. The port 43 is positioned such that it is constantly supplied with cold water regardless of whether the valve 16 is in the open or closed position. The fluid supply line 102 splits at a tee connector 106; one branch 108 runs to the first actuator valve 12, and the other branch 110 runs to the second actuator valve 14. The fluid supply line to the actuator valves 12 and 14 connect to the actuator valves in a standard manner at the inlets 54 and 54'.

A fluid signal line 112 connects the port 66 on the first actuator valve 12 to a port 114 to the chamber 48 of the on-off valve 16. A fluid exhaust line 120 connects the port 68 on the first actuator valve 12 to the port 29 on the cold on-off valve 16. The port 29 is positioned such that when the valve 16 is in the closed position (i.e., no fluid flowing through the valve 16), the fluid pressure in valve chamber portion 48 can be relieved through line 112, the open passageway between ports 66, 68 of valve 12 and the line 120.

Similarly, a fluid signal line 122 connects the outlet 66' of valve 14 to the outer portion 48' of chamber 36'. When valve 14 is opened fluid pressure will be communicated to such chamber portion to move the valve element 30' to open position such that hot water may flow through the valve 18 to its outlet 28'. When valve 14 closes, the pressure in the chamber 48' is relieved by the open passageway through line 122, ports 66' and 68' and an exhaust line 123 connected to the port 29' of valve 18.

The actuator valves 12, 14 are mounted in the base 20 of a cabinet (FIG. 2) such that the externally threaded portions 124 and 124' of the valves protrude a short distance through the base apertures 21 and 23. Nuts (not shown) are threaded onto the threaded portions 124 and 124' to secure the valves in place. When the actuator valves are mounted in this manner, the actuator balls 94 and 94' protrude a short distance outwardly from the base 20.

The Kick Plate

The actuator valves 12 and 14 are selectively moved into their open positions by the user depressing selected portions of a kick plate means 130, which is hingedly mounted to the base 20 of the cabinet (FIG. 2). The kick plate means 130 comprises an upper, mounting portion 132, a first actuator plate 136, and a second actuator plate 134 connected to the base plate by hinge 138. The mounting portion 132 is attached to the base 20 of the cabinet above apertures 21 and 23 such that the actuator plate 134 is positioned in front of the actuator ball 94' for the valve 14, and the actuator plate 136 is positioned in front of the actuator ball 94 for the valve 12.

A tab 140 extends from first actuator plate 136 behind the back side of the second actuator plate 134 such that movement of the latter toward the base also causes the actuator plate 136 to swing toward the base 20.

To move the actuator valve 12 into the open position, the user pushes a foot against the actuator plate 136 to swing toward the base 20 and depress actuator ball 94. This will move the actuator valve 12 into the open position. Thus, when the actuator plate 136 is actuated by the user, only the actuator valve 12 is actuated (i.e., moved into the open position). When the actuator plate 136 is released, the valve spring 92 will move the valve 12 to closed position.

When pressure is applied against the first actuator plate 134, it engages the tab 140 on the second actuator plate 136. This causes both the second actuator plate 136 and the first actuator plate 134 to swing toward the base 20 of the cabinet. As a result, the actuator ball 94' on the actuator valve 14 is forced inwardly, moving the actuator valve 14 into the open position, and the actuator ball 94 on the actuator valve 12 is simultaneously forced inwardly, moving the actuator valve 12 into the open position. Thus, when the actuator plate 134 is depressed by the user, both actuator valves 12 and 14 are simultaneously opened.

When pressure is released from the actuator plate 134, the pressure exerted by the compression springs 92 and 92' forces both the actuator valves 12 and 14 back into the shut-off position.

Operation

To induce a flow of water to the wash basin 120, the user depresses either the first actuator plate 134 or the second actuator plate 136 of the kick plate 130, FIG. 2. If the user desires warm water, the user depresses the second actuator plate 134, causing both the first actuator valve 12 and the second actuator valve 14 to be actuated to open position. Water supplied through the fluid supply line 102 therefore flows through the actuator valves 12 and 14, and into the signal lines 112 and 122 respectively. This pressurizes the chambers 48 and 48', as discussed above, which moves both of the on-off valves 16 and 18 to open position. Thus, O-rings 40 and 40' unseat from shoulder areas 36 and 36', opening fluid pathways through each of the on-off valves. This in turn begins the simultaneous flow of hot water through the valve 18, and cold water through the valve 16 to the mixing valve 118 and to the wash basin 120. As long as the actuator plates 134, 136 are depressed, warm water will flow to the basin.

On the other hand, when solely the first actuator plate 136 is actuated, only the first actuator valve 12 is moved into the open position, and only the cold on-off valve 16 is opened, and only cold water flows to the wash basin 120.

When the actuator plate 136 is released, the water flow through the on-off valve 16 is stopped. The compression spring 92 shifts the plunger 70 to its shut-off position. In this position a fluid path is opened from the chamber 48 of the on-off valve 16 to atmosphere through the port 114, line 112, the ports 66 and 68 of the actuator valve 12 and exhaust line 120. This occurs when the uppermost O-ring 86 seats against the first seat 58, and the middle O-ring 84 simultaneously unseats from the second seat 60.

When the chamber 48 is depressurized, the spring 44 shifts the valve element 30 to closed position closing off flow of cold water to the wash basin 120.

Release of the second actuator plate 134 when it is depressed functions to stop fluid flow through both of the on-off valves 16, 18 in a similar manner.

Although the mixing valve 118 (shown in block form in FIG. 1) used with the present invention is not shown in detail, standard mixing valves well known in the art function well with this invention. Such valves may include a regulator adjustable to regulate the flow of hot water relative to the flow of cold water when both on-off valves are in the open position. This regulates the temperature of the water flowing through the mixing valve. In addition, standard mixing valves also regulate the overall flow rate of water through the faucet, regardless of which on-off valves are open.

Having illustrated and described a preferred embodiment of the invention, it will be apparent to those skilled in the art that the invention permits modification in arrangement and detail.

I claim as my invention all such modifications as come within the true spirit and scope of the appended claims:

1. A valve assembly, comprising:
   a normally closed first on-off valve connected to a first fluid source;
   a normally closed second on-off valve connected to a second fluid source;
   a first actuator valve for opening the first on-off valve;

a second actuator valve for opening the second on-off valve; and a kick plate comprising a first actuator plate configured for actuating solely the first actuator valve, and a second actuator plate configured for simultaneously actuating the first and second actuator valves.

2. The vale assembly of claim 1, wherein actuation of the first actuator valve by the kick plate sends a signal solely to the first on-off valve, and the first on-off valve opens in response to the signal for inducing a flow of the first fluid.

3. The valve assembly of claim 1, wherein actuation of the first and second actuator valves by the kick plate sends a signal simultaneously to the first and second on-off valves, and the on-off valves open in response to the signal for inducing a flow of the first and second fluids.

4. A foot-actuated valve assembly, comprising:

a first actuator valve connected to a fluid source, and including a spring for normally biasing the valve into the shut-off position;

a first on-off valve connected to the first fluid-powered actuator valve and a fluid source, and including a spring for normally biasing the on-off valve into the shut-off position and means responsive to pressure of fluid received from said first actuator valve for opening said first on-off valve;

a second actuator valve connected to a fluid source and including a spring for normally biasing the valve into the shut-off position;

a second on-off valve connected to the second fluid-powered actuator valve and a fluid source, and including a spring for normally biasing the valve into the shut-off position and means responsive to pressure of fluid received from said second actuator valve for opening said second on-off valve;

a first manually operable actuator plate configured upon operation for moving solely the first fluid-powered actuator valve out of the shut-off position to induce a flow of fluid through the actuator valve to the first on-off valve, the fluid moving the first on-off valve out of the shut-off position; and second manually operable actuator plate configured upon operation for moving simultaneously the first and second fluid-powered actuator valves out of the shut-off position to induce a flow of fluid through both actuator valves and to the first and second on-off valves, thereby to move the first and second on-off valves to open position.

5. The foot-actuated valve of claim 4 including a mixing valve connected to receive fluid from the first and second on-off valves, and for mixing the fluids received therefrom.

6. A valve assembly, comprising:

a normally closed first on-off valve connected to a source of a first fluid, the first on-off valve configured for opening to permit flow of said first fluid in response to a fluid signal transmitted thereto;

a normally closed second on-off valve connected to a source of a second fluid, the second on-off valve configured for opening to permit flow of said second fluid in response to a fluid signal transmitted thereto;

a first actuator valve operatively connected to said first on-off valve for providing a fluid signal thereto for effecting opening of said first valve to permit flow of said first fluid through the first on-off valve;

a second actuator valve operatively connected to said first on-off valve and said second on-off valve for providing a fluid signal thereto for effecting opening of said second valve and said first valve to permit flow of the first fluid through the first on-off valve, and the second fluid through the second on-off valve; and first manually operable means for actuating solely the first actuator valve, and second manually operable means for simultaneously actuating the first and second actuator valves.

7. A foot-controlled valve assembly adapted for mounting in the base of a cabinet for controlling the flow of water to a basin, comprising:

a normally closed first on-off valve connected to a cold water source;

a normally closed second of-off valve connected to a hot water source;

a first actuator valve for opening the first on-off valve;

a second actuator valve for opening the first on-off valve; and a kick plate means adapted to be mounted to the base of the cabinet, the kick plate means comprising a first actuator plate operable for manually actuating solely the first actuator valve, and a second actuator plate operable for manually actuating the first and second actuator valves simultaneously.

* * * * *

UNITED STATES PATENT AND TRADEMARK OFFICE
CERTIFICATE OF CORRECTION

PATENT NO.   :   5,203,373
DATED        :   April 20, 1993
INVENTOR(S)  :   Austin, Jr. et al.

It is certified that error appears in the above-identified patent and that said Letters Patent is hereby corrected as shown below:

Column 8, claim 7, line 42, "first" should be --second--.

Signed and Sealed this

Twenty-second Day of February, 1994

Attest:

BRUCE LEHMAN

*Attesting Officer*      *Commissioner of Patents and Trademarks*